United States Patent
Asano et al.

(10) Patent No.: US 10,403,891 B2
(45) Date of Patent: Sep. 3, 2019

(54) POSITIVE ELECTRODE MATERIAL AND LITHIUM ION BATTERY

(71) Applicant: Panasonic Intellectual Property Management Co., Ltd., Osaka (JP)

(72) Inventors: Kazuko Asano, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 15/003,163

(22) Filed: Jan. 21, 2016

(65) Prior Publication Data

US 2016/0240848 A1  Aug. 18, 2016

(30) Foreign Application Priority Data

Feb. 13, 2015  (JP) ................. 2015-025962

(51) Int. Cl.
*H01M 4/485* (2010.01)
*H01M 4/38* (2006.01)
*H01M 4/505* (2010.01)
*H01M 4/525* (2010.01)
*C01G 53/00* (2006.01)
*H01M 4/04* (2006.01)
*H01M 4/1391* (2010.01)
*H01M 10/0525* (2010.01)
*H01M 10/0569* (2010.01)

(52) U.S. Cl.
CPC ............ *H01M 4/505* (2013.01); *C01G 53/56* (2013.01); *H01M 4/525* (2013.01); *H01M 10/0525* (2013.01); *H01M 10/0569* (2013.01); *H01M 2300/0034* (2013.01)

(58) Field of Classification Search
CPC ............ H01M 4/505; H01M 10/0525; H01M 2300/0034; H01M 10/0569; H01M 4/525
See application file for complete search history.

(56) References Cited

U.S. PATENT DOCUMENTS

| | | | | |
|---|---|---|---|---|
| 2011/0200879 A1* | 8/2011 | Saito | ..................... | H01M 4/131 429/221 |
| 2015/0037680 A1* | 2/2015 | Park | ..................... | H01M 4/583 429/231.8 |
| 2015/0171427 A1* | 6/2015 | Eckl | ..................... | C01G 53/50 427/126.3 |

FOREIGN PATENT DOCUMENTS

| | | |
|---|---|---|
| JP | 2008-270201 | 11/2008 |
| JP | 2010-282874 | 12/2010 |

* cited by examiner

*Primary Examiner* — Muhammad S Siddiquee
(74) *Attorney, Agent, or Firm* — McDermott Will & Emery LLP

(57) ABSTRACT

A positive electrode material includes an active material represented by $Li_2Mn_{(1-2x)}Ni_xMo_xO_3$ (where $0<x<0.4$).

7 Claims, 2 Drawing Sheets

POSITIVE ELECTRODE MATERIAL AND LITHIUM ION BATTERY

BACKGROUND

1. Technical Field

The present disclosure relates to lithium ion batteries and positive electrode materials for the same.

2. Description of the Related Art

Japanese Unexamined Patent Application Publication No. 2008-270201 discloses a positive electrode material for lithium ion batteries. The positive electrode material is represented by $xLiMO_2 \cdot (1-x)Li_2NO_3$, where x represents a number satisfying $0<x<1$, M represents at least one transition metal with an average oxidation state of +3, and N represents at least one transition metal with an average oxidation state of +4.

Japanese Patent No. 5344236 discloses a positive electrode for lithium secondary batteries. The positive electrode includes a solid solution represented by $Li_x[Mn_{(1-y)}Me_y]O_z$, where Me represents at least one metal element other than Li and Mn (except for B, Al, Ga, and In) with $1<x<2$, $0 \leq y<1$, and $1.5<z<3$.

SUMMARY

The related art fails to increase the capacity of lithium ion batteries.

In one general aspect, the techniques disclosed here feature a positive electrode material including an active material represented by $Li_2Mn_{(1-2x)}Ni_xMo_xO_3$ (where $0<x<0.4$). The techniques disclosed here feature a lithium ion battery including: a positive electrode including a positive electrode material; a negative electrode; and an electrolyte, wherein the positive electrode material including an active material represented by $Li_2Mn_{(1-2x)}Ni_xMo_xO_3$ (where $0<x<0.4$).

The present disclosure can increase the capacity of lithium ion batteries.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

DETAILED DESCRIPTION

Figure 1:
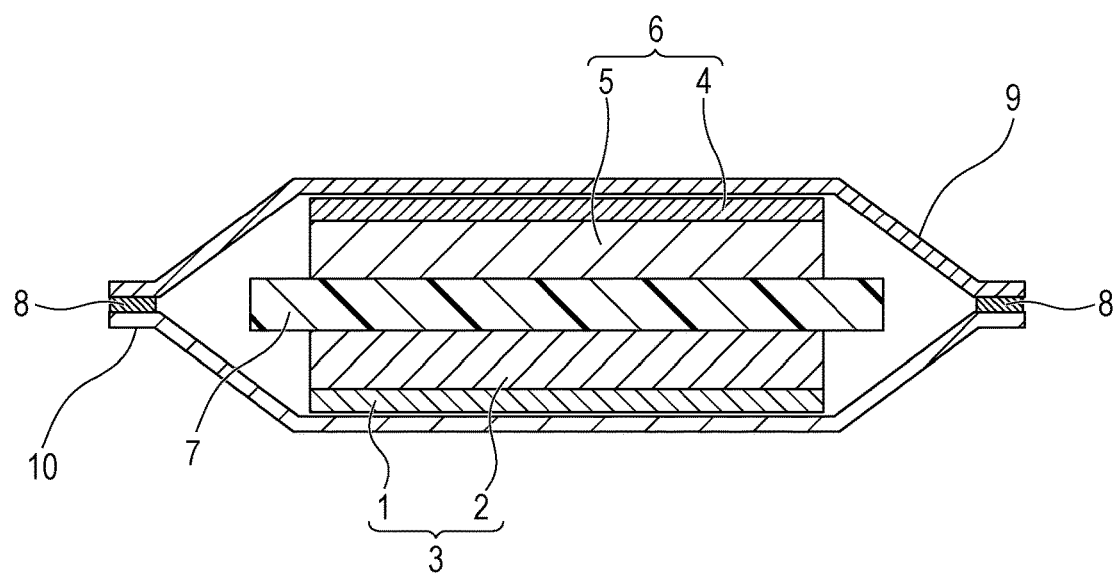
FIG. 1 illustrates the schematic configuration of a battery according to a first embodiment.

Hereinafter, embodiments will be described with reference to the drawings.

First Embodiment

A positive electrode material according to a first embodiment contains a positive electrode active material represented by a general formula: $Li_2Mn_{(1-2x)}Ni_xMo_xO_3$ (where $0<x<0.4$).

The above configuration can increase the capacity of a lithium ion battery.

A lithium ion battery according to the first embodiment includes a positive electrode containing the above positive electrode material, a negative electrode, and an electrolyte.

The above configuration can provide the lithium ion battery having a high capacity.

The lithium ion battery according to the first embodiment may be a secondary battery.

The inventor presumes that a high-capacity lithium ion battery can be provided by the following mechanism.

According to the positive electrode material in the first embodiment, the structure is stabilized by Mo and Ni to provide an increased capacity over materials known in the art. First, Ni can reduce the crystal structure instability resulting from the formation of a void layer in the related art described below. That is, Ni more easily enters Li phases than LiMn phases. Because of this, Ni contributes to the crystal structure even if Li is deintercalated from Li phases during charging, resulting in a stronger structure than those in the related art described below. Furthermore, Mo, which tends to form a covalent bond with oxygen, reduces the amount of oxygen released during charging. This also contributes to structural stability.

In contrast, $Li_2MnO_3$, which is a positive electrode material known in the art, has a layered structure in which Li phases composed of Li and LiMn phases having a regular array of Li and Mn at a ratio of 1:2 are layered. In charge reactions, all Li is deintercalated from Li phases to form void layers between layers. This tends to destabilize the crystal structure. When $Li_2MnO_3$ is used as a positive electrode active material, charging and discharging involve the oxidation reaction of oxygen during charging and the reduction reaction from Mn4+ to Mn3+ during discharging. To achieve high capacity here, a larger amount of Li is extracted. For example, Li is extracted at a ratio of Li/Mn=1.5, whereas Li is extracted at a ratio of Li/Co=0.5 for lithium cobalt oxide. As a result, the capacity rapidly deteriorates with charging and discharging. Accordingly, a larger amount of Li is extracted from the structure during charging. For this reason, the structure partially collapses and thus fails to provide the electrochemical capacity that the material originally has, so that the capacity rapidly decreases with charging and discharging. The structural collapse may result from, for example, oxygen release during charging. This oxygen release reduces the capacity of the battery.

As described above, the positive electrode material in the first embodiment contains the positive electrode active material represented by a general formula of $Li_2Mn_{(1-2x)}Ni_xMo_xO_3$, so that the structure can be stabilized. The positive electrode material thus can have a stable structure, for example, even after a large amount of Li is extracted from the structure during charging. A lithium ion battery having high energy density is obtained accordingly.

Next, the charge-discharge reaction mechanism presumed by the inventor is described.

When $Li_2Mn_{1-2x}Ni_xMo_xO_3$ is used as a positive electrode active material, theoretically two Li ions and two electrons can be used per transition metal atom. For this reason, the capacity for two-electron reactions is expected to be the maximum capacity.

During charging, Ni is oxidized from $Ni^{2+}$ to $Ni^{4+}$ through valence changes. During charging, oxygen is oxidized.

During discharging, Mn is reduced from $Mn^{4+}$ to $Mn^{3+}$. During discharging, Ni is reduced from $Ni^{4+}$ to $Ni^{2+}$ through valence changes. During discharging, Mo is reduced from $Mo^{6+}$ to $Mo^{4+}$ through valence changes.

Such reactions allow intercalation and deintercalation of two Li ions per transition metal atom. To cause these reactions, the valence of the elements in the active material before charging is desirably as follows: $Mn^{4+}$, $Ni^{2+}$, and $Mo^{6+}$. To maintain the ratio of $Li/(Mn_{1-2x}Ni_xMo_x)$ of 2 and the ratio of $oxygen/(Mn_{1-2x}Ni_xMo_x)$ of 3, the ratio of Mo and Ni is 1:1 to obtain the electrically neutral condition.

A single-phase composition can be synthesized when the x value is $0<x<0.4$ in $Li_2Mn_{1-2x}Ni_xMo_xO_3$. When x is 0.4 or more, it is difficult to synthesize a single-phase composition, resulting in generation of impurity phases of lithium manganese oxide, lithium molybdenum oxide, or the like.

Figure 2:
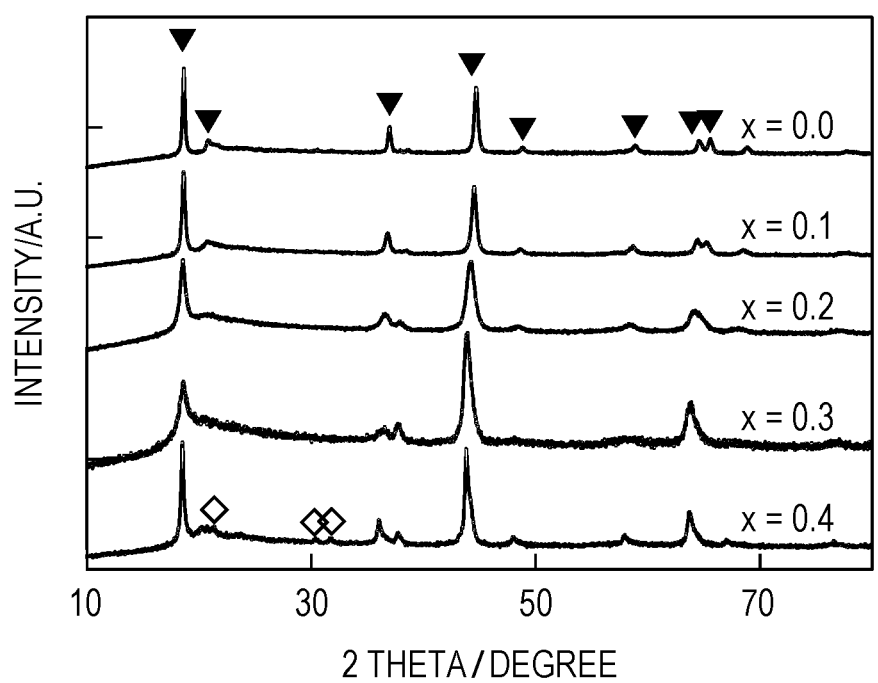
FIG. 2 illustrates the results of X-ray diffraction measurement of $Li_2Mn_{1-2x}Ni_xMo_xO_3$.

FIG. 2 illustrates the results of X-ray diffraction measurement of $Li_2Mn_{1-2x}Ni_xMo_xO_3$.

The black triangle symbols on FIG. 2 indicate peaks corresponding to $Li_2MnO_3$. The white diamond symbols on FIG. 2 indicate peaks corresponding to impurities.

As shown in FIG. 2, at $x<0.4$, there is a small amount of impurity phases, and no significant decrease in capacity is observed. At $x \geq 0.4$, the amount of impurity phases increases.

An increased amount of impurity phases is associated with reaction resistance during charging and discharging. This reaction resistance reduces the capacity of the battery.

From the above, the x value is preferably in the range of $0<x<0.4$ in the first embodiment.

Method for Producing Positive Electrode Active Material

Particles of $Li_2Mn_{1-2x}Ni_xMo_xO_3$ may be prepared by, for example, the following method.

A raw material mixture is obtained by mixing lithium compound particles, manganese compound particles, nickel compound particles, and molybdenum compound particles. Here, for example, the value x can be adjusted, by the adjustment of each mixing amount of these compounds.

Examples of lithium compounds include lithium hydroxide, lithium carbonate, lithium oxide, and lithium nitrate. Examples of manganese compound particles include manganese carbonate particles. Examples of nickel compounds include nickel oxide, nickel hydroxide, and nickel carbonate. Examples of molybdenum compounds include various molybdenum oxides and ammonium molybdate. However, lithium sources, manganese sources, nickel sources, and molybdenum sources are not limited to these examples, and various materials can be used.

The process of mixing lithium compound particles, manganese compound particles, nickel compound particles, and molybdenum compound particles may be performed by a dry method or by a wet method. In the mixing process, a mixing device, such as a ball mill, can be used.

The resulting material mixture is, for example, fired in the air to give $Li_2Mn_{1-2x}Ni_xMo_xO_3$. The firing process may be performed, for example, at temperatures of 600 to 1000° C. for 3 to 24 hours.

Configuration of Battery

FIG. 1 illustrates the schematic configuration of a battery according to a first embodiment.

In an exemplary configuration illustrated in FIG. 1, a positive electrode 3 includes a positive electrode current collector 1 and a positive electrode mixture layer 2 formed on the positive electrode current collector 1 and containing a positive electrode active material. A negative electrode 6 includes a negative electrode current collector 4 and a negative electrode mixture layer 5 formed on the negative electrode current collector 4 and containing a negative electrode active material. The positive electrode 3 and the negative electrode 6 are disposed so that the positive electrode mixture layer 2 and the negative electrode mixture layer 5 face each other with a separator 7 interposed therebetween. This electrode group is covered by a negative-electrode-side cover 9 and a positive-electrode-side cover 10. The battery illustrated in FIG. 1 includes a gasket 8.

Examples of battery shapes include, but are not limited to, a coin shape, a cylindrical shape, and a prism shape.

The positive electrode includes, for example, a positive electrode current collector and a positive electrode mixture on the positive electrode current collector. The positive electrode mixture can contain a positive electrode active material as well as a binder, a conductive agent, and the like. The positive electrode may be prepared by, for example, mixing a liquid component with a positive electrode mixture including optional components and a positive electrode active material to give a positive electrode mixture slurry, applying the resulting slurry to the positive electrode current collector, and drying the slurry.

The negative electrode includes, for example, a negative electrode current collector and a negative electrode mixture on the negative electrode current collector. The negative electrode mixture can include a negative electrode active material as well as a binder and the like. The negative electrode may be prepared by, for example, mixing a liquid component with a negative electrode mixture including optional components and a negative electrode active material to give a negative electrode mixture slurry, applying the resulting slurry to the negative electrode current collector, and drying the slurry.

Examples of negative electrode active materials that can be used include metals, metal fibers, carbon materials, oxides, nitrides, tin compounds, silicon compounds, and various alloy materials. Examples of carbon materials that can be used include various natural graphites, coke, partially graphitized carbons, carbon fibers, spherical carbons, various artificial graphites, and amorphous carbon. A simple substance of silicon (Si), tin (Sn), or the like, or silicon compounds or tin compounds, such as alloys, compounds, or solid solutions of silicon (Si), tin (Sn), or the like, have a large capacity density. Examples of silicon compounds that can be used include $SiO_x$ ($0.05<x<1.95$), and alloys, compounds, and solid solutions obtained by partially substituting Si in any of $SiO_x$ ($0.05<x<1.95$) with at least one element selected from the group consisting of B, Mg, Ni, Ti, Mo, Co, Ca, Cr, Cu, Fe, Mn, Nb, Ta, V, W, Zn, C, N, and Sn. Examples of tin compounds that can be used include $Ni_2Sn_4$, $Mg_2Sn$, $SnO_x$ ($0<x<2$), $SnO_2$, and $SnSiO_3$. Negative electrode active materials may be used alone or in combination of two or more thereof.

Examples of binders that can be used in the positive electrode or the negative electrode include PVDF, polytetrafluoroethylene, polyethylene, polypropylene, aramid resin, polyamide, polyimide, polyamideimide, polyacrylonitrile, polyacrylic acid, poly(methyl acrylate), poly(ethyl acrylate), poly(hexyl acrylate), polymethacrylic acid, poly (methyl methacrylate), poly(ethyl methacrylate), poly(hexyl methacrylate), poly(vinyl acetate), polyvinylpyrrolidone, polyether, polyethersulfone, hexafluoropolypropylene, styrene butadiene rubber, and carboxymethylcellulose. In addition, copolymers of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. These binders may be used in a mixture of two or more thereof.

Examples of conductive agents used in the electrode include graphites, such as natural graphites and artificial graphites; carbon blacks, such as acetylene black, Ketjenblack, channel black, furnace black, lamp black, and thermal black; conductive fibers, such as carbon fibers and metal fibers; metal powders, such as fluorocarbon powder and aluminum powder; conductive whiskers, such as zinc oxide and potassium titanate; conductive metal oxides, such as titanium oxide; and organic conductive materials, such as phenylene derivatives.

The mixing ratios of the positive electrode active material, the conductive agent, and the binder may be respectively 80 to 97 wt %, 1 to 20 wt %, and 1 to 10 wt %.

The mixing ratios of the negative electrode active material and the binder may be respectively 93 to 99 wt % and 1 to 10 wt %.

As the current collector, a long porous conductive substrate or non-porous conductive substrate is used. Examples of materials used for a conductive substrate as the positive electrode current collector include stainless steel, aluminum, and titanium. Examples of materials used for the negative electrode current collector include stainless steel, nickel, and copper. The thickness of these current collectors may be, but is not limited to, 1 to 500 µm. In particular, the thickness of the current collectors may be 5 to 20 µm. The thickness of the current collectors within the above range allows weight reduction while maintaining the strength of the electrode plates.

As a separator interposed between the positive electrode and the negative electrode, a microporous film, woven fabric, nonwoven fabric, or the like that has a high ion permeability as well as a predetermined mechanical strength and insulation may be used. As materials of the separator, for example, polyolefins, such as polypropylene and polyethylene, have a high durability and a shutdown function. These materials are accordingly preferred from the viewpoint of the safety of non-aqueous electrolyte secondary batteries. The thickness of the separator may be 10 to 300 µm or may be 40 µm or less. The thickness of the separator may also be in the range of 15 to 30 µm. In particular, the thickness of the separator may be 10 to 25 µm. The microporous film may be a single layer film formed of a single material. Alternatively, the microporous film may be a composite film or multilayer film formed of one or more materials. The porosity of the separator may be in the range of 30% to 70%. As used herein, the term "porosity" refers to the volume ratio of pores to the separator volume. The porosity of the separator may be in the range of 35% to 60%.

As an electrolyte, a liquid electrolyte, gel electrolyte, or solid electrolyte can be used.

A liquid electrolyte (non-aqueous electrolyte solution) is obtained by dissolving an electrolyte (e.g., lithium salt) in a solvent. A gel electrolyte contains an electrolyte (e.g., lithium salt) and a polymeric material carrying this electrolyte. Examples of the polymeric material that may be preferably used include polyvinylidene fluoride, polyacrylonitrile, polyethylene oxide, polyvinyl chloride, polyacrylates, and polyvinylidene fluoride-hexafluoropropylene. A solid electrolyte may be an organic solid electrolyte (e.g., polymer solid electrolyte) or an inorganic solid electrolyte. As an inorganic solid electrolyte, for example, a sulfide solid electrolyte and an oxide solid electrolyte may be used. As a sulfide solid electrolyte, for example, $Li_2S-P_2S_5$ and $Li_2S-SiS_2$ may be used. As an oxide solid electrolyte, for example, $LiNbO_3$ and $Li_3PO_4$ may be used.

As a solvent for dissolving an electrolyte (e.g., lithium salt), a publicly-known non-aqueous solvent can be used. Examples of non-aqueous solvents that can be used include, but are not limited to, cyclic carbonates, chain carbonates, and cyclic carboxylates. Examples of cyclic carbonates include propylene carbonate (PC) and ethylene carbonate (EC). Examples of chain carbonates include diethyl carbonate (DEC), ethyl methyl carbonate (EMC), and dimethyl carbonate (DMC). Examples of cyclic carboxylates include γ-butyrolactone (GBL) and γ-valerolactone (GVL). Such non-aqueous solvents may be used alone or in combination of two or more thereof.

In the first embodiment, a fluorinated solvent may be used as a non-aqueous solvent contained in the non-aqueous electrolyte solution. In this case, the fluorinated solvent may be at least one fluorinated solvent selected from the group consisting of fluoroethylene carbonate, methyl fluoropropionate, fluorobenzene, fluoroethyl methyl carbonate, and fluorodimethylene carbonate.

When the non-aqueous electrolyte solution contains such a fluorinated solvent, the non-aqueous electrolyte solution has improved oxidation resistance. As a result, the battery can be stably operated even when the battery is charged at a high voltage.

Examples of electrolytes to be dissolved in the non-aqueous solvent include $LiClO_4$, $LiBF_1$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lower-aliphatic lithium carboxylates, LiCl, LiBr, LiI, chloroboranelithium, borates, and imide salts. Examples of borates include lithium bis(1,2-benzenediolate(2-)-O,O')borate, lithium bis(2,3-naphthalenediolate(2-)-O,O')borate, lithium bis(2,2'-biphenyldiolate(2-)-O,O')borate, and lithium bis(5-fluoro-2-olate-1-benzenesulfonic acid-O,O') borate. Examples of imide salts include lithium bis(trifluoromethanesulfonyl)imide (($CF_3SO_2)_2NLi$), lithium (trifluoromethanesulfonyl)(nonafluorobutanesulfonyl)imide (LiN($CF_3SO_2$)($C_4F_9SO_2$)), and lithium bis(pentafluoroethanesulfonyl)imide (($C_2F_5SO_2)_2NLi$). These electrolytes may be used alone or in combination of two or more thereof.

The non-aqueous electrolyte solution may contain, as an additive, a material that is decomposed on a negative electrode to form a coating film having a high lithium ion conductivity and thus can increase the charge-discharge efficiency. Examples of additives having such a function include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate (VEC), and divinyl ethylene carbonate. These additives may be used alone or in combination of two or more thereof. Of these additives, at least one selected from the group consisting of vinylene carbonate, vinyl ethylene carbonate, and divinyl ethylene carbonate is preferred. The hydrogen atoms of the above compounds may be partially substituted with fluorine atoms. The amount of the electrolyte dissolved in the non-aqueous solvent may be in the range of 0.5 to 2 mol/L.

The non-aqueous electrolyte solution may contain a benzene derivative that is decomposed at the time of overcharge to form a coating film on an electrode and thus renders the battery inactive. As such a benzene derivative, one having a phenyl group and a cyclic compound group adjacent to the phenyl group may be used. As a cyclic compound group, for example, a phenyl group, a cyclic ether group, a cyclic ester group, a cycloalkyl group, and a phenoxy group may be used. Specific examples of the benzene derivative include cyclohexylbenzene, biphenyl, and diphenylether. These benzene derivatives may be used alone or in combination of two or more thereof. The content of the benzene derivative may be 10 vol % or less of the entire non-aqueous solvent.

EXAMPLES

Example 1

(1) Production of Positive Electrode Active Material

Lithium carbonate, manganese carbonate, nickel hydroxide, and molybdenum oxide were weighed in predetermined amounts and placed in different containers. Here, these raw materials were weighed at a molar ratio Mn:Ni:Mo of 0.8:0.1:0.1. These were mixed together to give a material mixture. The resulting material mixture was fired in the air atmosphere at 700° C. for 12 hours. In Example 1, $Li_2Mn_{0.8}Ni_{0.1}Mo_{0.1}O_3$, which is $Li_2Mn_{1-2x}Ni_xMo_xO_3$ where x=0.1, was obtained as a positive electrode active material.

(2) Production of Positive Electrode Plate

Seventy parts by weight of the above positive electrode active material was mixed with 20 parts by weight of acetylene black as a conductive agent, 10 parts by weight of N-methylpyrrolidone (NMP) as a binder, and an appropriate amount of polyvinylidene difluoride (PVDF). This provided a paste containing a positive electrode mixture. This paste was applied to both sides of a 20-μm-thick aluminum foil to be a current collector, dried, and then rolled. This provided a 60-μm-thick positive electrode plate having a positive electrode active material layer. Subsequently, the positive electrode plate was punched out in the form of a circle having a diameter of 12.5 mm to give a positive electrode.

(3) Production of Negative Electrode Plate

A 300-μm-thick lithium metal foil was punched out in the form of a circle having a diameter of 14.0 mm to give a negative electrode.

(4) Preparation of Non-Aqueous Electrolyte Solution

Fluoroethylene carbonate (FEC), ethylene carbonate (EC), and ethyl methyl carbonate (EMC) were mixed at a volume ratio of 1:1:6 to give a non-aqueous solvent. In this non-aqueous solvent, $LiPF_6$ was dissolved at a concentration of 1.0 mol/liter to give a non-aqueous electrolyte solution.

(5) Production of Battery

A battery having the configuration illustrated in FIG. 1 was produced. A separator (available from Celgard, LLC.; Celgard 2320; thickness: 25 μm) was impregnated with the non-aqueous electrolyte solution. A CR2032 coin battery was produced in a dry box maintained at a dew point of −50° C. It is noted that Celgard 2320 is a trilayer separator having a polypropylene layer, a polyethylene layer, and a polypropylene layer.

Example 2

As a positive electrode active material, $Li_2Mn_{0.6}Ni_{0.2}Mo_{0.2}O_3$, which is $Li_2Mn_{1-2x}Ni_xMo_xO_3$ where x=0.2, was used. That is, in the production of this positive electrode active material, raw materials were weighed at a molar ratio Mn:Ni:Mo of 0.6:0.2:0.2 and mixed. A battery was produced in the same manner as in Example 1 except that the composition ratio of this positive electrode material was thus changed.

Example 3

As a positive electrode active material, $Li_2Mn_{0.4}Ni_{0.3}Mo_{0.3}O_3$, which is $Li_2Mn_{1-2x}Ni_xMo_xO_3$ where x=0.3, was used. That is, in the production of this positive electrode active material, raw materials were weighed at a molar ratio Mn:Ni:Mo of 0.4:0.3:0.3 and mixed. A battery was produced in the same manner as in Example 1 except that the composition ratio of this positive electrode material was thus changed.

Example 4

As a positive electrode active material, $Li_2Mn_{0.2}Ni_{0.4}Mo_{0.4}O_3$, which is $Li_2Mn_{1-2x}Ni_xMo_xO_3$ where x=0.4, was used. That is, in the production of this positive electrode active material, raw materials were weighed at a molar ratio Mn:Ni:Mo of 0.2:0.4:0.4 and mixed. A battery was produced in the same manner as in Example 1 except that the composition ratio of this positive electrode material was thus changed.

Comparative Example

As a positive electrode active material, $Li_2MnO_3$, which is free of Ni and Mo, was used. A battery was produced in the same manner as in Example 1 except that the composition of this positive electrode material was thus changed.

Evaluation of Batteries

The batteries were charged at a constant current of 0.05 CmA up to the upper-limit voltage of 4.8 V and further charged at a constant voltage of 4.8 V to reach a current of 0.01 CmA.

The batteries were discharged at a constant current of 0.05 CmA to reach a final voltage of 1.5 V.

Table 1 shows the first discharge capacity of the batteries.

As shown in Table 1, the batteries according to Examples 1 to 4 have a larger first discharge capacity than the battery according to Comparative Example.

TABLE 1

|  | Comparative Example | Example 1 | Example 2 | Example 3 | Example 4 |
|---|---|---|---|---|---|
| x Value | 0 | 0.1 | 0.2 | 0.3 | 0.4 |
| Capacity (mAh/cc) | 1216 | 1228 | 1278 | 1264 | 1300 |

Table 2 shows the change in crystallinity before and after charging of the batteries. Specifically, Table 2 is a table showing the ratio of change in half width in the Miller indices (0 0 1) and (2 2 0) determined by XRD as a measure of the degree of structural collapse of the positive electrode materials before and after charging. The ratio of change in half width refers to the ratio of a half width after charging to a half width before charging.

TABLE 2

|  | $Li_2MnO_3$ | $Li_2Mn_{0.6}Ni_{0.2}Mo_{0.2}O_3$ |
|---|---|---|
| Ratio of Change in Half Width (After Charging/Before Charging) Miller Index (0 0 1) 2θ = 18.8 [degrees] | 0.61 | 0.82 |
| Ratio of Change in Half Width (After Charging/Before Charging) Miller Index (2 2 0) 2θ = 18.8 [degrees] | 0.87 | 0.88 |

The higher the ratio of change is, the higher the degree to which the crystallinity (structure) is maintained. Table 2 indicates that the positive electrode materials of Examples even after charging tend to maintain their structures compared with the positive electrode material according to Comparative Example.

As described above, the batteries according to the first embodiment and Examples have improved structural stability. The batteries according to the first embodiment and Examples thus can have an increased discharge capacity over materials known in the art.

The positive electrode material according to the present disclosure may be used as, for example, a positive electrode material for lithium ion batteries.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A positive electrode material comprising:
an active material represented by $Li_2Mn_{(1-2x)}Ni_xMo_xO_3$, where $0<x<0.4$.

2. A lithium ion battery comprising:
a positive electrode including a positive electrode material;
a negative electrode; and
an electrolyte,
wherein the positive electrode material including an active material represented by $Li_2Mn_{(1-2x)}Ni_xMo_xO_3$, where $0<x<0.4$.

3. The lithium ion battery according to claim 2, wherein the electrolyte is a non-aqueous electrolyte solution including a fluorinated solvent, and the fluorinated solvent is at least one fluorinated solvent selected from the group consisting of fluoroethylene carbonate, methyl fluoropropionate, fluorobenzene, fluoroethyl methyl carbonate, and fluorodimethylene carbonate.

4. The positive electrode material according to claim 1, wherein the active material represented by $Li_2Mn_{(1-2x)}Ni_xMo_xO_3$ is a single-phase composition.

5. The lithium ion battery according to claim 2, wherein the active material represented by $Li_2Mn_{(1-2x)}Ni_xMo_xO_3$ is a single-phase composition.

6. The positive electrode material according to claim 1, wherein $0.3 \leq x < 0.4$.

7. The lithium ion battery according to claim 2, wherein $0.3 \leq x \leq 0.4$.

* * * * *